United States Patent [19]

Datwyler et al.

[11] Patent Number: 5,495,573
[45] Date of Patent: Feb. 27, 1996

[54] ERROR LOGGING SYSTEM WITH CLOCK RATE TRANSLATION

[75] Inventors: Wayne C. Datwyler, Laguna Niguel; Long V. Ha, Walnut; Dan T. Tran, Laguna Niguel, all of Calif.

[73] Assignee: Unisys Corporation, Blue Bell, Pa.

[21] Appl. No.: 286,855

[22] Filed: Aug. 5, 1994

[51] Int. Cl.$^6$ ................................. G11C 29/00
[52] U.S. Cl. .................. 395/185.01; 395/185.10; 395/183.10; 395/183.22; 371/21.6; 371/61
[58] Field of Search .................... 395/375, 325, 395/275, 575, 183.10, 183.21, 183.22, 185.01, 185.08, 185.10; 371/4, 5.1, 15.1, 16.1, 16.5, 21.6, 29.1, 29.5, 61; 364/285

[56] References Cited

U.S. PATENT DOCUMENTS

| | | | |
|---|---|---|---|
| 4,695,952 | 9/1987 | Howland | 364/200 |
| 4,821,269 | 4/1989 | Jackson et al. | 371/16.1 |
| 5,060,140 | 10/1991 | Brown et al. | 364/281.3 |
| 5,090,014 | 2/1992 | Polich et al. | 371/15.1 |
| 5,255,375 | 10/1993 | Crook et al. | 364/270.5 |
| 5,404,462 | 4/1995 | Datwyler et al. | 395/325 |

Primary Examiner—Robert W. Beausoliel, Jr.
Assistant Examiner—Dieu-Minh Le
Attorney, Agent, or Firm—Alfred W. Kozak; Mark T. Starr; Robert R. Axenfeld

[57] ABSTRACT

An error logging system where errors are captured on dual system busses operating at a lower clock rate (16 MHz) than the processor which receives the error information. The system functions to substantially reduce the loads on the processor in addition to maximizing the use of the system bus drivers which are pin-constrained. The processor operates at a higher clock rate (32 MHz). Processor commands to read error data from an error log register are synchronized down to the 16 MHz rate, then enabled onto a processor bus after a second synchronization operation back to the higher (32 MHz) rate. Provision is made for identifying several different types of error categories. An expandable error log register system is provided which uses selected bit positions to identify types of errors logged to the processor which also enables expansitivity for adding in future types of errors into the error logging system and renders compatibility for a processor operating at first clock rate with error data sensed at a second clock rate.

5 Claims, 11 Drawing Sheets

NOTE: THE SMALL NUMBER IN EACH CIRCLE REPRESENTS THE VALUE G_MSEL(3:0)

ERROR LOGGING SYSTEM WITH CLOCK RATE TRANSLATION

FIELD OF THE INVENTION

This disclosure involves systems and methods for loading error data or information into a processor in a computer system using dual bus facilities.

BACKGROUND OF THE INVENTION

One prior art system involving error logging is shown in the Child Patent, U.S. Pat. No. 5,121,475 entitled "Methods of Dynamically Generating User Messages Utilizing Error Log Data With A Computer System". This error log request system is concerned with how the errors are analyzed by software and displayed to the user. It does not deal with the situation of how a central processor will physically read the errors involved. The present disclosure functions to indicate how a central processor can physically read the errors involved.

Another error logging system is described in U.S. Pat. No. 4,932,028 entitled "Error Log System For Self-Testing in Very Large Scale Integrated Circuit (VLSI) Units". This involves self-testing and error reporting in an integrated circuit chip.

The presently described configuration involves the method of transferring the error log data from a XILINX device into the processor via an independent shift chain control. The present system makes use of this error logging method on errors which can be transmitted on two system busses.

GENERAL OVERVIEW

In the operations of a computer system where the processor communicates through dual busses to a memory storage unit and where the processor can execute Read or Write commands to the memory or to an auxiliary input/output (I/O) unit, errors may occur during these cycles of operation. If an error is detected during such a Read operation or Write operation, an error signal will be made active during the same clock as an acknowledgement to the processor that the operation has "completed". This is typical of the presently described computer system. The returned error signal tells the processor that while the operation did a "completion", there occurred an error and any data that was returned to the processor should be considered "invalid".

When an error signal occurs, the processor will do a "Read error log" (RDELOG) command in order to determine what the characteristic of the error was, so that subsequent recovery operations may proceed.

When the processor is running at high speed the number of "loads" on the processor bus will directly affect the speed that data can be written by the processor and loaded into the processor. Thus the number of loads must be kept to a minimum in order to achieve the highest speed of operation possible.

The term "loads" refers to the number of separate devices that the source point or originator of a signal must drive. For example, in the present configuration, reference is made to the number of loads on the "g-bus", alternatively called the processor bus, (G-Bus).

In this situation, there are several devices which can load the bus. These may include: the processor chip, the cache chip, the data path chip, command/coding logic and the cache data RAM chip. This constitutes four loads.

Problems arise in that each load adds capacitance to the signal lines. The more capacitance involved, the longer it takes for driven signals to become stable. Then the longer the signals take, the slower that the machine system will run. Thus it is most desirable to decrease the number of "loads".

One additional problem occurs and that is that all possible processor drivers are severely pin-constrained. That is to say, that the input and output pins on the integrated chips are limited, and it is not possible to add any input and output lines to the chip. Therefore, it is necessary to load error information into a pre-existing processor bus driver using the minimum number of pins so that the bus driver can, in time, drive this data to the processor upon demand.

In the architecture of the present computer system, the processor is running at a different clock speed than the logic units that are logging the errors. In a situation such as this, the error data must be synchronized in order to provide a compatible transfer to the processor.

The present system illustrates a method to load error data or other information into a processor wherein the processor is constrained by the number of drivers that can be used on the processor bus. The drivers which drive data to the processor are in all cases severely pin-constrained.

As seen in FIG. 1B, there is a diagram of the typical architecture of the present computer system wherein a central processing module having a processor is connected to a main memory subsystem through two system busses 22A, 22B. The busses provide lines for the reading of data out of the memory back to the processor and also for the writing of data from the processor to the main memory. When a Read or a Write cycle is completed, then an acknowledge signal is sent from the main memory to the processor.

FIG. 1A shows a simplified diagram indicating how the processor bus 51 connects a data path gate array 32 to the processor 20. Two system busses, 22A and 22B, connect to the data path gate array 32 and are controlled by the system bus interface logic, $20_i$.

FIG. 1A is an overall block diagram of the present system which uses the error logging operations. A processor 20 is serviced by the processor bus control logic $20_f$ and the cache unit $20_{ch}$. Each of these three modules operate at a first clock rate of 32 MHz.

The remaining modules basically operate at a second clock rate which is lower, that is to say, 16 MHz, for example. These modules include the system busses 22A and 22B which are connected to the data path gate array 32 and also to the system bus interface logic $20_i$. The system bus interface logic $20_i$ is controlled by the data path control logic 26 which is also connected to the processor bus control logic $20_f$. A processor bus 51 connects the data path gate array 32 to the processor 20.

When the processor 20 issues a command, and address and data, this will be put into the data path gate array 32 at the 32 MHz clock rate. The command is then issued and synchronized into a 16 MHz rate where all the data handling is done at this 16 MHz speed in the data path gate array 32.

The processor bus control logic $20_f$ operates at the 32 MHz clock rate and handles the interface between the processor 20, the cache unit $20_{ch}$ and the data path 32 which includes command decoding, loading the register in the data path gate array 32 and controlling the multiplexor in the data path gate array 32, in addition to sending commands to the data path control logic 26 and receiving acknowledgements from the system bus interface logic $20_i$.

The data path control logic 26 includes a Data Control LCA 26 which converts the 32 MHz clock rate into a 16 MHz clock rate. It controls the routing of data within the data path gate array 32 as well as allowing communication of commands between the processor bus control logic $20_f$ and the system bus interface logic $20_i$.

The system bus interface logic $20_i$ implements the system bus protocol as well as routing data between the data path gate array 32 and the system busses 22A, 22B.

The data path gate array 32 operates partially at 16 MHz and also at the 32 MHz clock rates and it provides a data path through its registers and multiplexors in order to route data through the system.

When an error signal is detected by the processor 20, then the processor will institute a "read error log command" after which the processor bus driver will load error information into the gate array 32 and then provide this information to the processor. The "bus driver" in this system is the gate array 32. The processor control logic $20_f$ constitutes a "load".

Errors are logged at a different clock rate then the processor clock rate, because most of the errors of interest occur during operations over the dual system busses 22A and 22B. There are two system busses and these busses both run at 16 megahertz. Once the address and data are extracted and loaded into the data path gate array 32, FIG. 2, during an operation, then most of the operational functions take place at 16 megahertz.

The error-log function (in the Error Log LCA 28 in FIG. 2) is expandable because all errors are logged in a XILINX 3042 LCA (logic circuit array) which is easily programmable many times over. The LCA can easily be reprogrammed to increase the number or type of errors that are logged. However, the size of the register inside the data path gate array 32 (that the errors are shifted into) is fixed. It is fixed at a larger size then the portion of the error-log 30 in the XILINX device 28, however, so that there is still room for the size of the error-log to grow or increase, thus providing expandability.

Generally it is found that the bus drivers are "pin-constrained" that is to say, there never seems to be enough input/output pins to handle all the needs of the circuitry since most of the available pins are generally used for other purposes. This presents a problem to which the present disclosure provides answers.

Most of the available pins in bus drivers are used for purposes other then what the designer might require. Thus a problem arises as how to get the maximum use of a bus driver and still have enough I/O pins left to meet the requirements of the system circuitry involved.

While it would have been possible to have the XILINX error log device 28 act as a bus driver itself, or to log the errors within the data path and then send the errors directly to the processor, this arrangement would involve liabilities which can be overcome in other ways. If the XILINX LCA 28 were used as a bus driver, it would add another "load", plus add more capacitance and then slow down the bus capacity. If the XILINXLCA 28 were logged in the data path, there would be a loss of flexibility in defining "errors" i.e., it would require the use of many "pins" to define the error types.

SUMMARY OF THE INVENTION

The present system provides a method to load error data or other information into a processor in a situation where the processor bus is constrained in the number of bus drivers that can be used on the processor bus. This is accomplished in a situation where the errors are found and logged at a first clock rate (16 MHz) and then synchronized at a second clock rate (32 MHz) for reporting errors to the processor.

During Read operation cycles and Write operation cycles in the computer system, any indication of errors occurring on the processor busses will be conveyed to a holding gate array which then can provide the information, as to the type of error, to the main processor.

The present system includes a method to inform the processor that an error has occurred during a system bus operation cycle. In this case, the processor will initiate a read of the error log register in a gate array. This 32 MHz initiating command is translated to a 16 megahertz clock rate data path which will cause a error log register to be shifted into the gate array which then drives a processor bus. After this the data is driven into the processor.

Since an unusual number of "loads" will slow down the speed of the system, it is important to the greater efficiency of the system that the system have a capability for decreasing the number of loads on the processor bus along with all the possible processor bus drivers which also are "pin-constrained".

In the present system, arrangements are made for logging errors in a device that has many "free" pins (such as a XILINX 3042), and then subsequently shifting a chain into the data path gate array before the data is driven to the processor through an existing processor driver.

DESCRIPTION OF PREFERRED EMBODIMENT

Figure 1A:
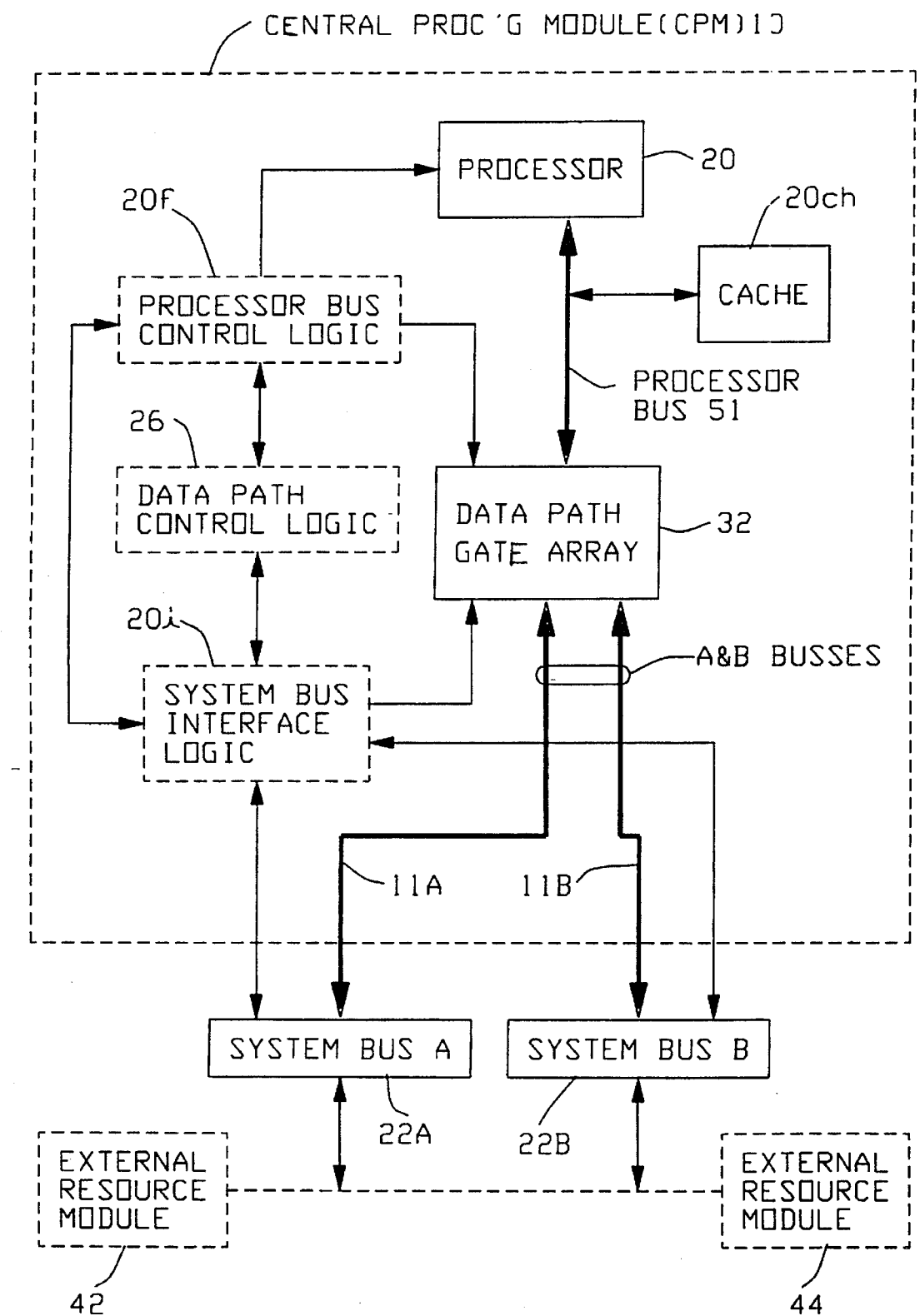
FIG. 1A is a block drawing of the system with a data path gate array which holds the error log register.
Figure 1B:
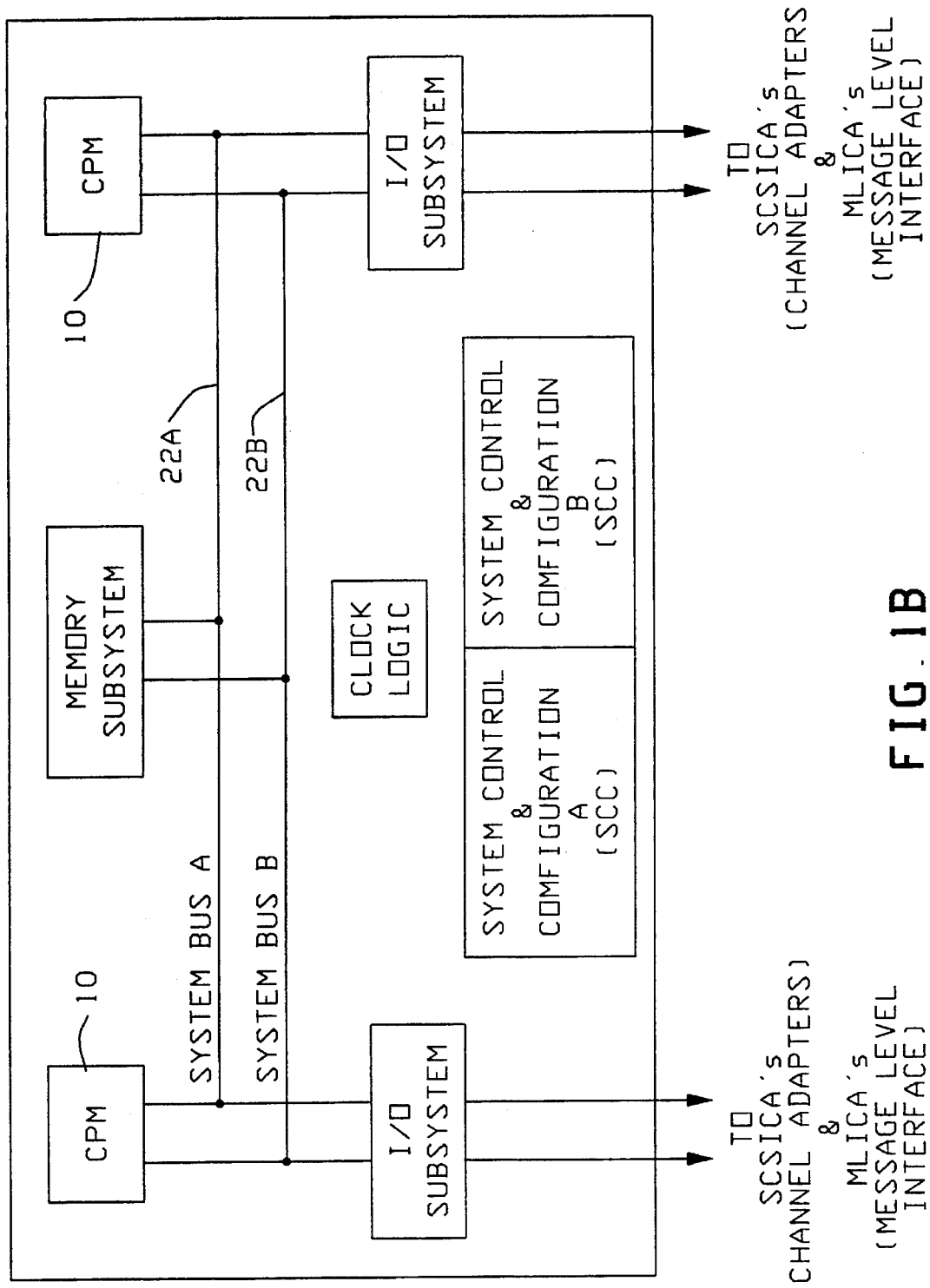
FIG. 1B is a block diagram of a computer system having a central processing module which communicates through dual system busses to a main memory and/or to auxiliary input/output modules.

FIG. 1B is an overall block diagram of a central processing module 10 (CPM) using the presently described error logging arrangement.

As seen in FIG. 1B, there may be one or more central processor modules, CPMs 10, connected onto dual system busses designated as system bus 22A and system bus 22B. Connected to the system busses is the main memory subsystem. Each of the central processing modules connect to the dual system busses and also connect to individual I/O subsystems which can then be connected to external modules such as a small computer systems interface channel adapter (SCSI-CA) and message level interface channel adapter (MLI-CA). The system configuration includes a clock logic and system control and configuration circuitry (SCC) for bus A and bus B.

FIG. 1A is a diagram showing the relationship of the main processor 20 connected via a processor bus 51 to the data path gate array 32. The data path gate array 32 has two busses 11A and 11B which connect respectively to the system busses 22A and 22B.

A processor bus control logic module $20_f$ connects the processor 20, and the data path gate array 32 onto a data path control logic unit 26. The data path control logic unit 26 connects the data path gate array 32 and the system bus 30 interface logic $20_i$ which monitors the access to the system bus 22A and system bus 22B. The system bus interface logic $20_i$ provides error sensing circuitry which monitors the data on system busses 22A, 22B and then transmits any error data to the ELog register 30 via the bus 60 of FIG. 2.

Figure 11:
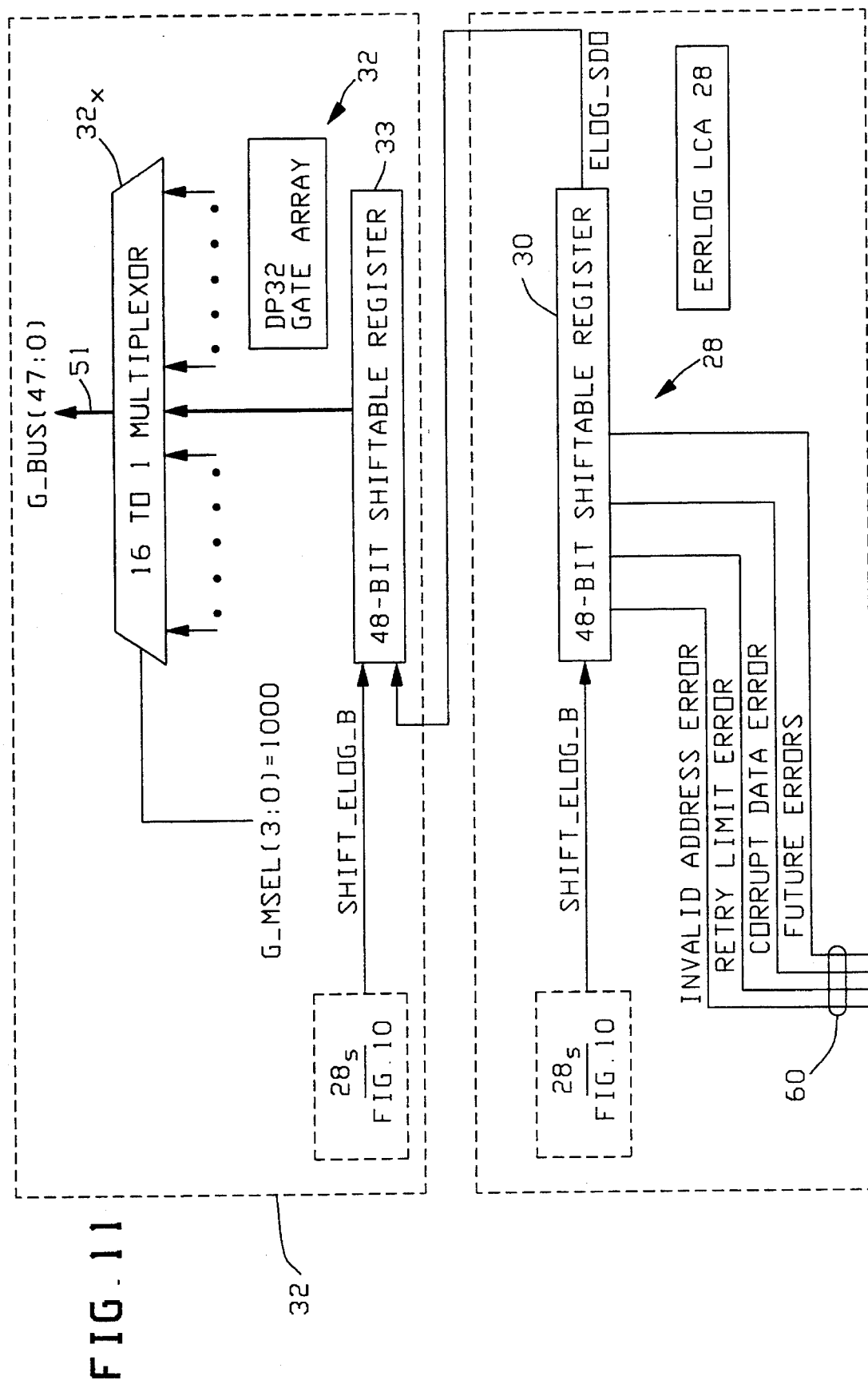
FIG. 11 is a drawing indicating how data is shifted from the error-log logic cell array (LCA) to the gate array.

In computer system operations, the processor will initiate action via the system busses in order to do a Read operation or a Write operation to either input/output unit or to a main memory unit. During these operations initiated by the processor, an error may occur in the data bytes being transmitted on the system. It is essential that the processor be cognizant and aware of any errors which occur during these operations. Several different types of errors are sensed and logged in a error-log unit (33, FIG. 2) provided in the data path gate array 32 by the system. The types of errors involved are:

(a) The "invalid address error": this indicates that the module, from which the central processor module 10 was trying to read or write from, did not acknowledge the operation. FIG. 11 shows this error input signal into register 30.

(b) A "retry limit error": which indicates that an operation was retried 256 times, but a retry was asserted by another module in the meantime. FIG. 11 shows this input to register 30 in the system bus interface logic $20_i$ (FIG. 2).

(c) "Corrupt Data" error signal: on the system busses 22A, B, there are 2 bits associated with each data word: These indicate (i) corrupt or (ii) corrupt_B. The corrupt signal should normally be "0" while the corrupt_B a "1". If any other values than this appear, then the system will log a corrupt data error. This signal is shown in FIG. 11 and feeds into the register 30.

Figure 2:
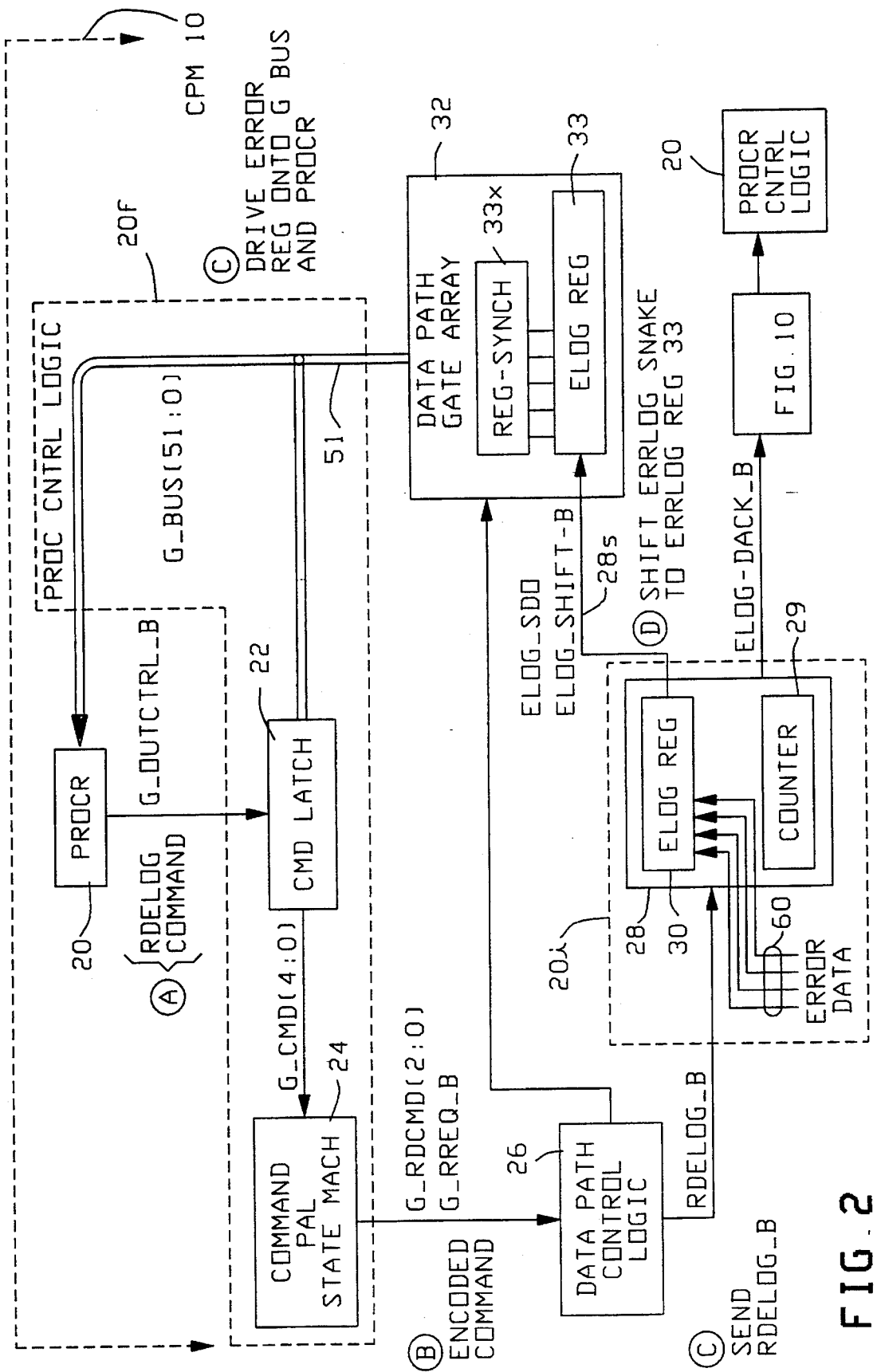
FIG. 2 is a block diagram showing the logic units working with the processor and the error-log register for developing error information to be sent to the processor.

(d) Each data byte is in the error-log shift chain "D", $28_S$ shown in FIG. 2. Errors are originally logged here because the XILINX logic cell array devices (26, 28) have a high pin count and are register rich, thus making it economical to look at many signals and to implement wide shift chains.

The present system in FIGS. 2 and 11, provides an error-log register 30 (of 16 bits) in the error log logic cell array 28, FIG. 2, which is subsequently shifted into the error log register 33 (of 48 bits) in gate array 32.

The data path gate array 32 is used for holding the error-log register 33 with error signals from the system busses. This is done after gate array 32 is loaded by the error log LCA 28, FIG. 10, upon command of processor 20. This data is fed from the XILINX error-log logic cell array (LCA) 28 in FIGS. 2 and 10 the error log register 33, FIG. 11.

Figure 7:
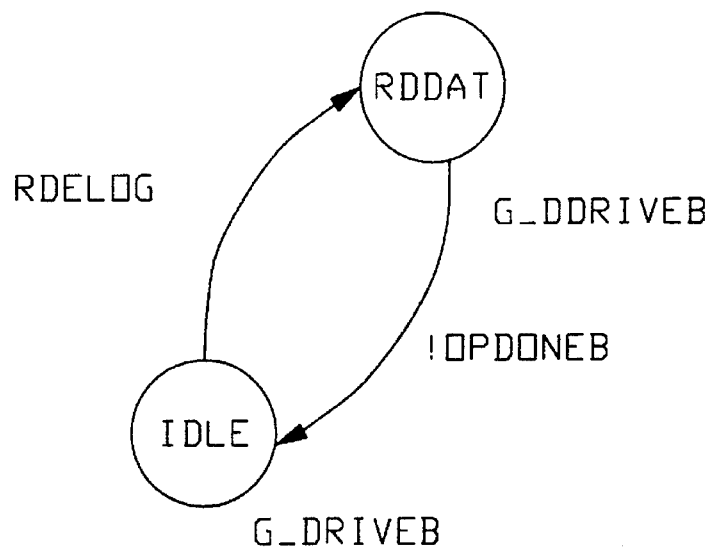
FIG. 7 is a sketch showing state transitions in the drive control state machine.

The same mechanism (error-detection logic which checks for invalid address, retry limit signals and RDDAT, Read Data FIG. 7 data errors) that causes an error to be logged in the error-log register 30 of LCA 28 also causes an error recognition to be signaled to the processor 20 when an acknowledgement is sent to the processor that a given cycle of operation is complete. When an error has been indicated, the processor 20, FIG. 2, will initiate a "Read Error Log" command to find out what caused the error.

Referring to FIG. 2 there is seen a block diagram of the various elements involved in providing for the reading of the error log register 33. FIG. 2 is a drawing of the central processing module 10 wherein a processor 20 is connected to a bus 51 and which uses a set of units of programmable array logic (PALs) and also logic cell arrays (LCAs) in combination with a gate array 32 having an error log register 33.

FIG. 2 indicates the steps used in sending error data to the processor 20 in the computer system wherein there are constraints on the number of bus drivers which can be used and constraints on the number of pins which can be utilized in the bus drivers. In arranging all required functions in gate array 32, practically all available pins were used, thus it was necessary to reduce the number of possible driver modules attached to the processor bus 51.

Additionally, FIG. 2 indicates a series of steps to illustrate the sequence of events involved, shown as steps A, B, C, D, E:

(A) The processor command to read out error-log data is decoded by command decoder logic in the command latch 22 of FIG. 2, and latched into the CMDLATCH PAL 22. The command is encoded into five bits, G_CMD(4:0) that will cause a state machine in the command PAL 24 to enter a transition.

(B) The command PAL 24 sends out an encoded command with two signals as follows: G_RDCMD(2:0) and also G_RREQ_B. These signals are clocked at a 32 megahertz frequency rate. These signals are later synchronized to 16 megahertz with a flip-flop in a logic cell array 26 designated as DCTRL LCA (Data Path Control Logic). The synchronization is done here because all of the various commands by the processor must be done in the same location. Thus the DCTRL LCA 26 latches the command and synchronizes it. LCA indicates a Logic Cell Array.

(C) The Data Path Control Logic LCA 26 (DCTRL LCA) will then send out a signal RDELOG_B for a period of one clock over to the unit 28 designated as the error-log LCA 28 (ERROG LCA), located in the system bus interface logic $20_i$ (FIG. 1A). This will initiate a counter 29 within the LCA 28 to begin counting 16 steps.

(D) The signal in FIG. 2, designated ELOG_SHIFT_B then becomes active for 16 clocks, shifting (via line $28_S$) the data in 16-bit error-log register 30 into the bottom 16-bits of a 48-bit register 33 within the gate array 32. (DP 32)

Once the 16 bits have been shifted, the 16 MHz signal ELOG_DACK_B becomes active for one clock. This signal is synchronized by flip-flop $28_{f2}$ FIG. 10, to 32 megahertz and tells the processor control logic $20_f$ that the error-log data can now be accessed.

(E) The data from error-log register 33 is now driven on to the bus 51 at the 32 MHz rate, G_BUS(47:0) (FIG. 11), where it is read by the processor 20. Under control of the Data Path Control Logic 26, the error data in register 33 (FIG. 2) is parallel loaded into a synchronization register $33_x$ which operates at the 32 MHz rate compatible with the processor bus 51 and processor 20.

Figure 3:
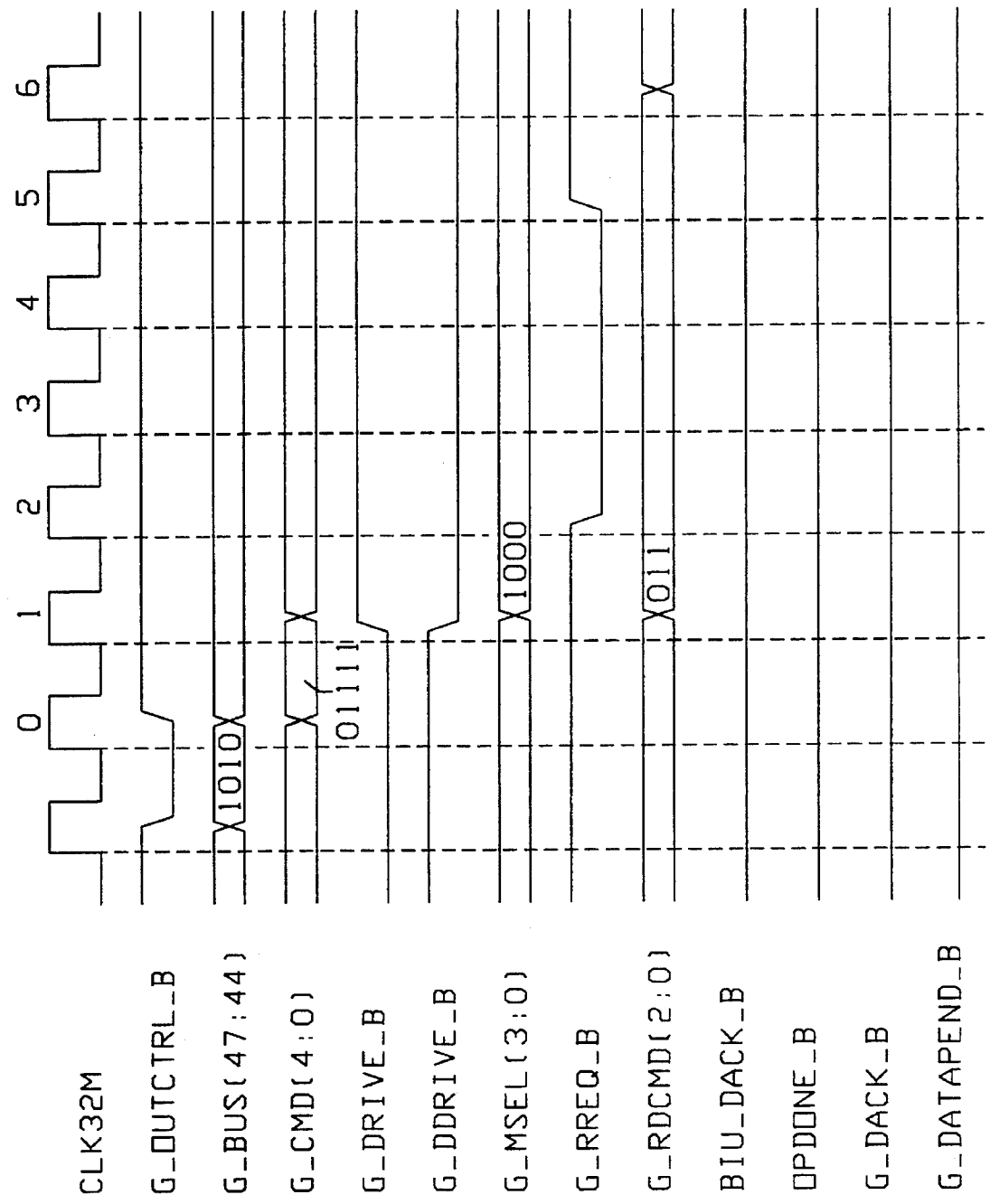
FIG. 3 is a timing diagram showing the various commands and signals involved for reading the error-log unit.

FIG. 3 is a timing diagram showing how the operation begins, as initiated by the processor 20, in order to read the data from the synchronization register $33_x$, FIG. 2.

Figure 12:
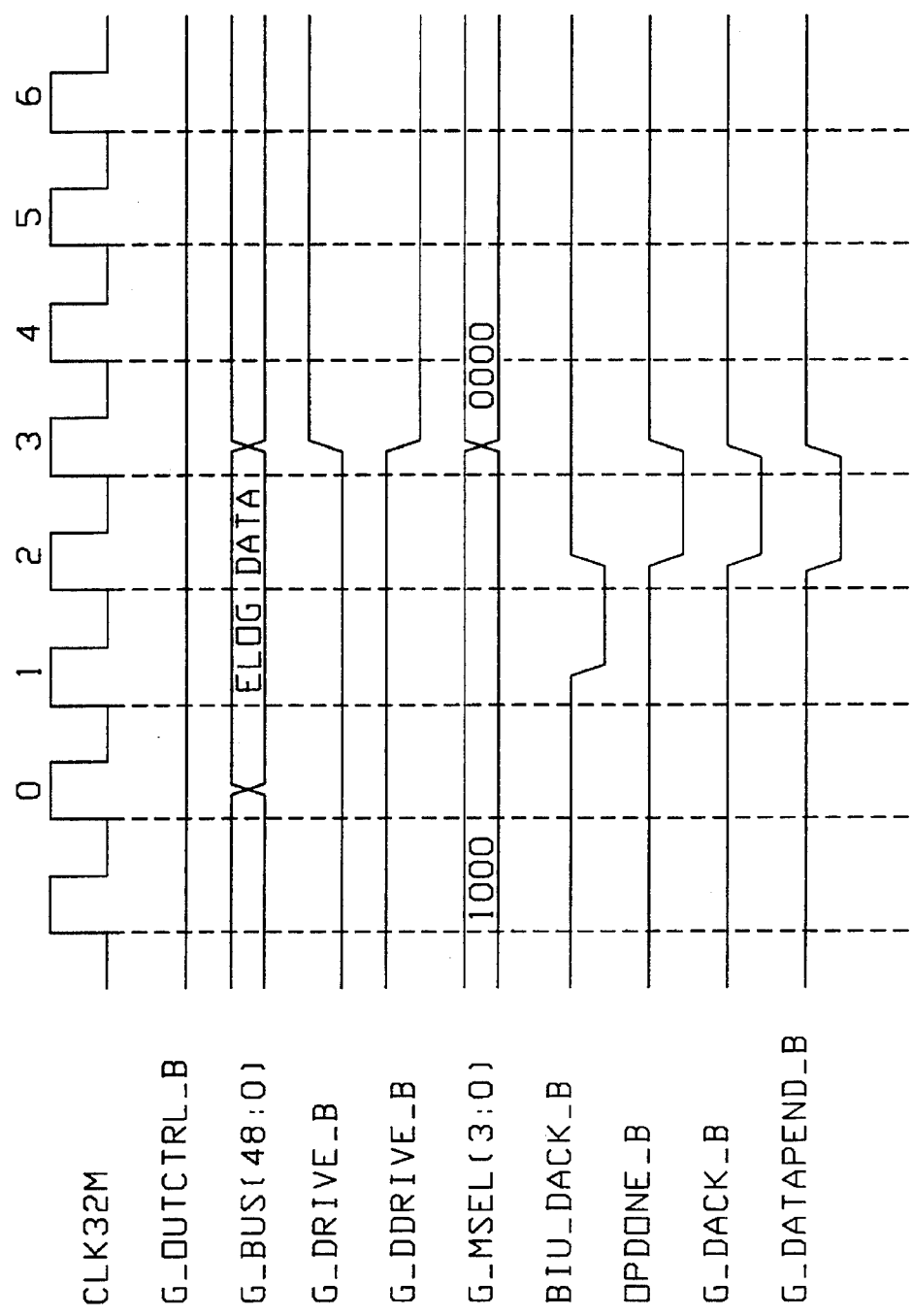
FIG. 12 is a timing diagram showing the end-final operation in the reading of the error-log unit.

The attached Glossary defines the signals shown in FIGS. 3 and 12.

GLOSSARY FOR FIG 3

G_OUTCRL_B: This signal becomes active from the processor when it wants to begin a command. It is interpreted by the processor control logic $20_p$, FIG. 2.

G_BUS(47:44): These are the encoded bits which designate the type of processor command "1010" which is the command designating a read_elog command. This is driven by the processor bus 20 and interpreted by the processor control logic $20_f$, FIG. 2.

G_CMD(4:0): This is an encoded command distributed to the processor control logic $20_f$ indicating that the current command is a read_log. Generated and used by the processor bus control logic $20_f$.

G_DRIVE_B: When low, this signal causes the processor to drive the processor bus 51. It is generated by the processor bus control logic $20_f$.

G_DDRIVE_B: When low, this signal causes the data path gate array 32 to drive the processor bus 51. It is generated by the processor bus control logic $20_f$, FIG. 2.

G_MSEL(3:0): These encoded signals designate which register within the data path gate array 32 will be sourced to be driven to the processor 20. In this case, the value "1000" refers to the ELOG Register 33. It is generated by the processor bus control logic and driven to the data path gate array 32.

G_RREQ_B: This signal validates the signals G_RDCMD(2:0). It is generated by the processor bus control logic $20_f$ and driven to the data path control logic 26 for synchronization.

G_RDCMD(2:0): This signal indicates to the data path control logic 26 to initiate the read elog (error log), causing error data to be shifted from the XILINX device ERROR LOG 28, FIG. 2 of System Bus Interface Logic, $20_i$, FIG. 1A into the gate array 32.

BIU_DACK B: This signal indicates to the processor control bus logic $20_f$ that the error information is currently being driven via the data path 32 to the processor 20. It is driven by the data path control logic 26 and is received by the processor control logic $20_f$.

OPDONE_B: When low, this signal indicates that the read_elog command has been completed. The signal is used internally in the processor bus control logic $20_f$.

G_DACK_B: This signal to the processor 20 causes it to load the error information being driven to it. It is generated by the processor bus control logic $20_f$.

G_DATAPEND_B: This signal to the processor is also needed to cause the error information to be loaded from the processor bus bus 51. It is generated by the processor control logic $20_f$.

Figure 4:
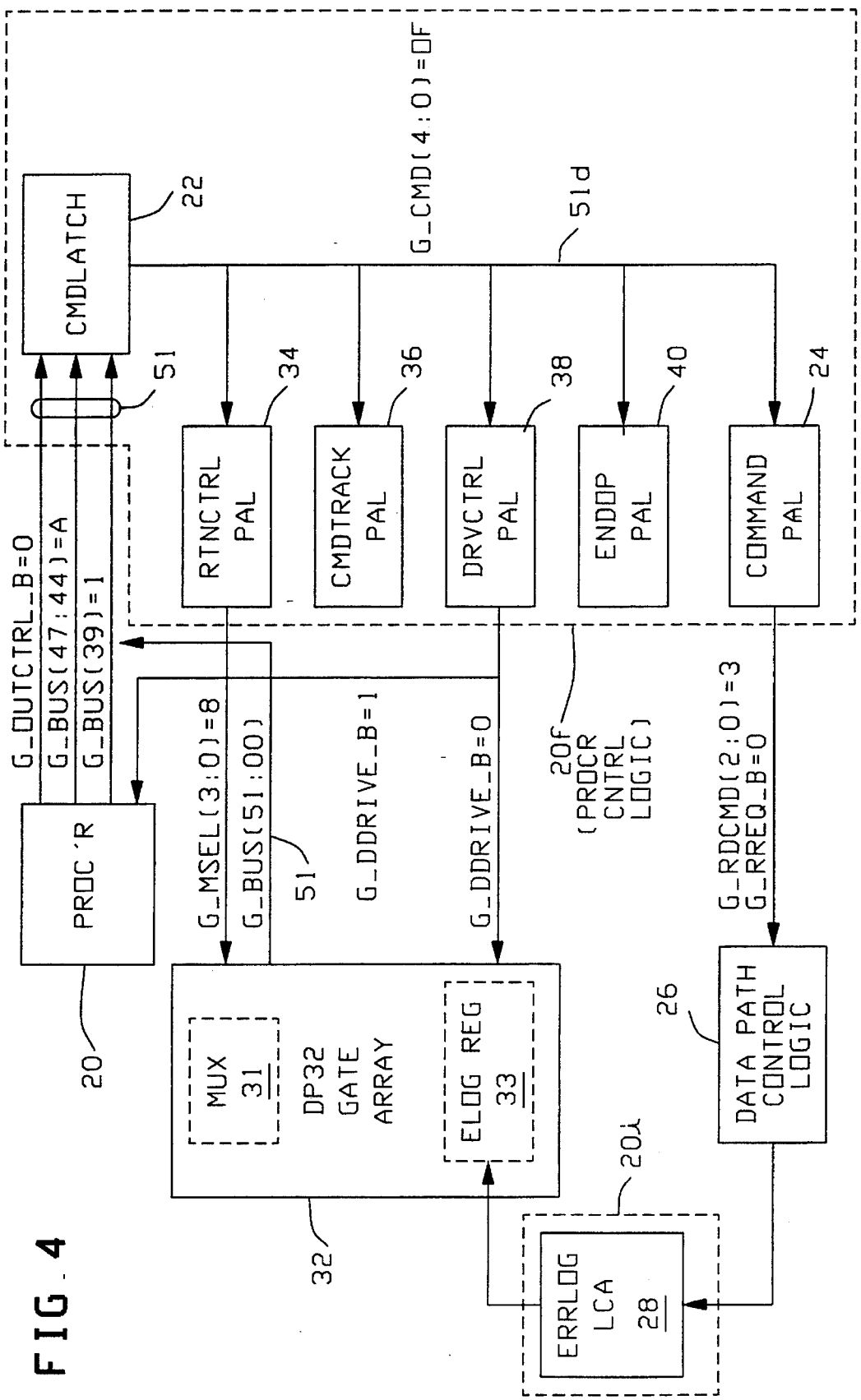
FIG. 4 is a block diagram of the logic units involved to initiate the Read error-log command.

G_BUS(51:0): This is the processor bus 51 which carries 51 bits of information. FIG. 4 is a drawing to indicate how the operation for error-log reading is initiated by the processor 20. The cycle begins by asserting the value x'A' on the processor's data lines G_BUS(47:44) and a value of x'1' on the G_BUS(39). This is the operation which encodes the value required for a "Read error-log command". "A" herein is a hexadecimal notation for binary "1010". The "x" before each value indicates the "value" is in hexadecimal format.

The signal G_OUTCTRL_B must be equal to x'0' to qualify these values as being a processor command.

This processor command is decoded by the command latch program array logic 22 (PAL). One clock later, the command latch 22 PAL drives signal G_CMD(4:0) to the value of xOF. This tells all the other programmable logic units that the current operation is a "READ_ELOG" command, and they will react accordingly.

As seen FIG. 4, the following programmable array logic units (PALs) will have state machines with internal transitions and these includes the units: RTNCTRL 34 (return control unit), the CMDTRACK 36 (command track unit), the DRVCTRL 38 (the drive control unit), the ENDOP 40 (end of operation unit), and the COMMAND PAL 24.

The return control PAL 34 has the function of controlling a 16-bit multiplexor 31 within the gate array 32. When the signal G_CMD(4:0) equals x' of (01111), this will cause a transition to the error-log (ELOG) state (1000) (FIG. 5).

Figure 5:
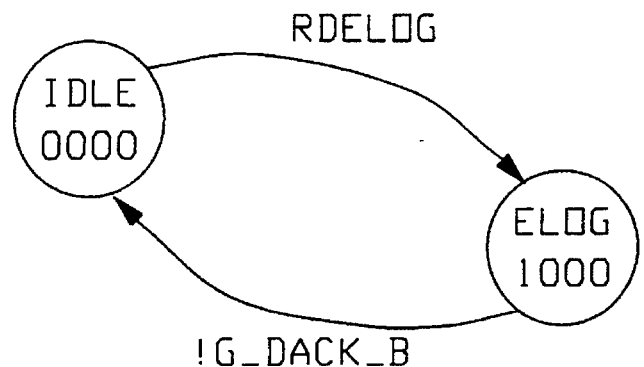
FIG. 5 is a state machine drawing showing state transitions of the return control programmable array logic.

Then, as illustrated in FIG. 5, the value of the signal G_MSEL(3:0) becomes "1000", causing the error-log register 33 within the gate array 32 to be driven on to the G_BUS(51:0).

FIG. 5 shows the state machine transitions in the return control PAL 34.

As seen in FIG. 5, the "idle" state shows that the value of the signal GMSEL(3:0) is 0000 while the value of the signal GMSEL(3:0) in the error-log state is equal to 1000. It is seen that the idle state will transition to the read error-log state and the error-log state will transition to the "Idle" state by means of the acknowledgement signal !G_DACK_B, becoming active.

The command track CMDTRK PAL 36 (FIG. 4) serves the function of keeping track of the progress of the operation of sending error-log information to the processor, 20.

Figure 6:
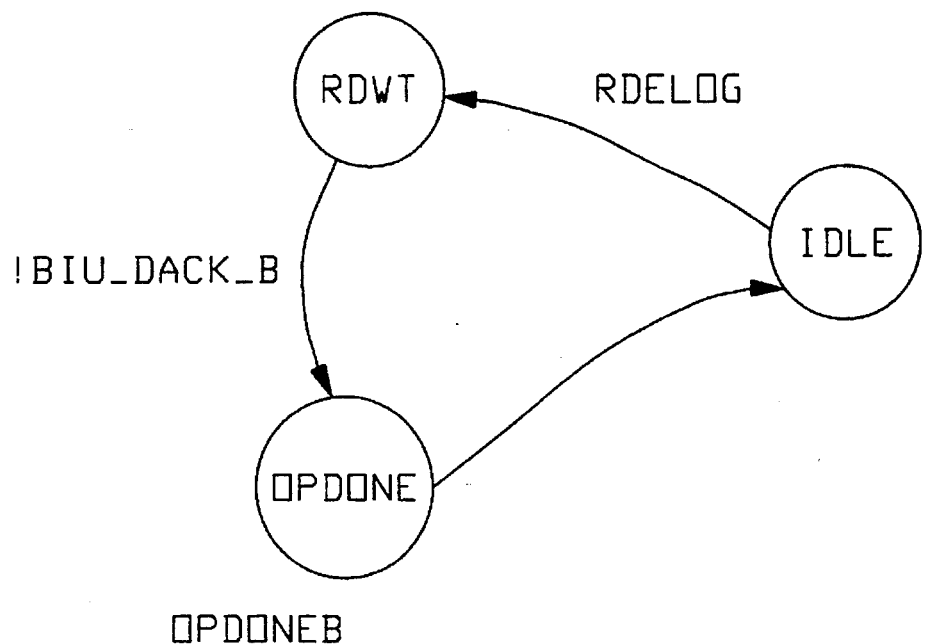
FIG. 6 is a sketch showing transitions involved in the command track state machine.

When the signal G_CMD(4:0) equals F' it will transition to the RDWT (Read-Write) state as seen in the upper part of FIG. 6. As FIG. 6 illustrates, the state machine (CMDTRACK 36) will remain in this state until valid data is being driven by the gate array 32 as indicated by the signal !BIU_DACK_B becoming active.

Thus in FIG. 6, the "Idle" state will transition to the Read-Write state (RDWT), when the READ_ELOG command is active, which will then transition to the "operation-done" state (OPDONE) outputting the OPDONE_B signal, and will then return to the "Idle" state.

The drive control PAL (programmable array logic) unit (DRVCTRL 38) in FIG. 4 serves the function of determining whether the processor 20 or the gate array 32 is driving G_bus 51. When the G_CMD(4:0) equals F', the PAL 38 will transition to the RDDAT state (read data state). This is seen in FIG. 7 where the "Idle" state transitions the read error-log into the read-data-state (RDDAT) after which the "operation done" signal,!OPDONEB, will cause the transition back to the "Idle" state.

Figure 8:
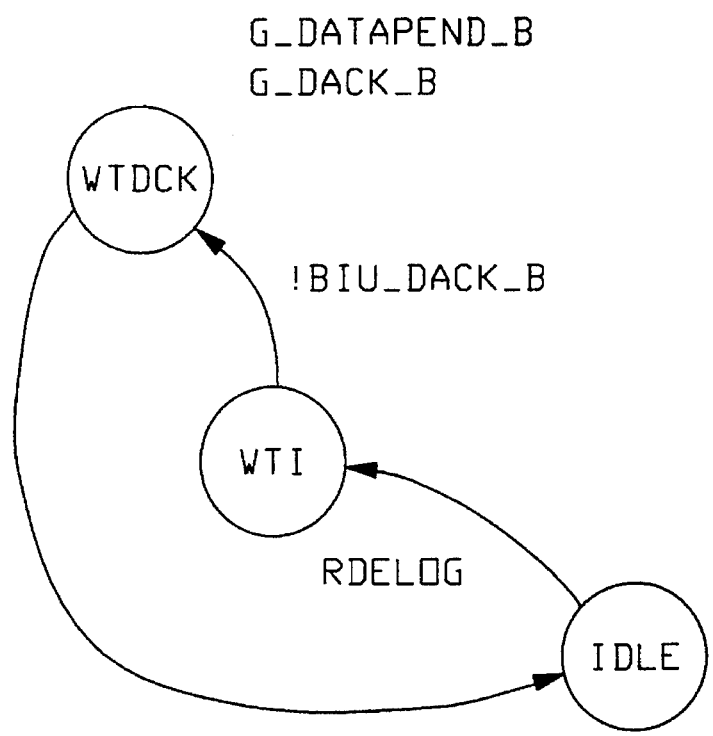
FIG. 8 is a sketch showing certain state transitions in the ENDOP (end of operation) state machine.

At the RDDAT state in FIG. 7, this will cause the processor 20, FIG. 2, to stop driving the G_BUS 51 with G_DRIVE_B going "high" from DRVCTRL PAL 38 and the gate array 32 will begin driving the G_BUS 51 with G_DDRIVE_B going "low", in anticipation of data being driven back. The state machine 40, (FIG. 4 ENDOP PAL) will remain in this state with no valid outputs until valid data is being driven by the gate array 32. This is indicated by the signal !BIU_DACK_B becoming active as seen in FIG. 8 between the Write-one state (WT1) and the Write acknowledge state (WTDCK), G_DACK_B after which there is a return to the idle state.

The command PAL 24 of FIG. 4 serves the function of driving the currently used command to the data path control unit 26 (DCTRL LCA) of FIG. 4. When the G_CMD(4:0)= F, the command PAL 24 will transition to the RGO0 state shown in FIG. 9. During this state, the signal G_RD-CMD(2:0), FIG. 4, which is the Read command, asserts a value over the following clock, and the signal G_RREQ_B=0 will become active for the next three clocks, that is to say, through the transitions RG01, RG02 and RG03 shown in FIG. 9.

Figure 9:
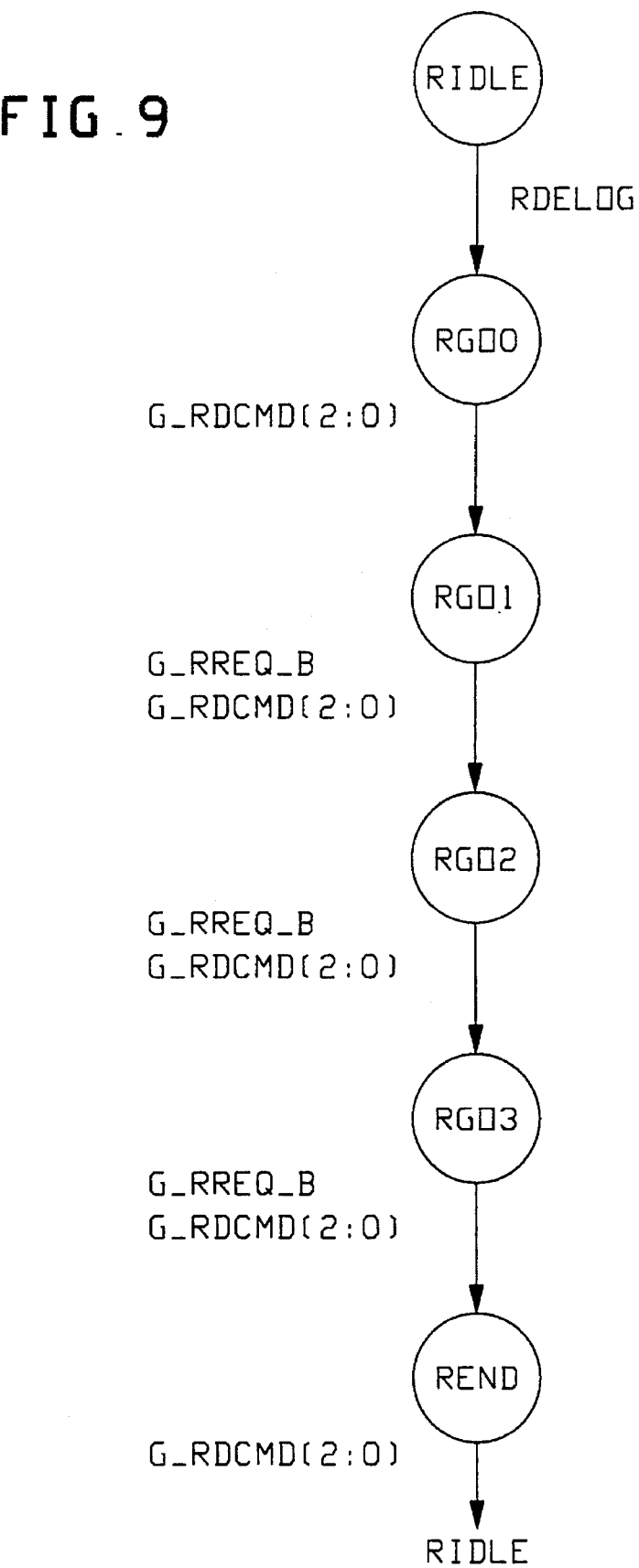
FIG. 9 shows the state transitions of the command programmable array logic.
Figure 10:
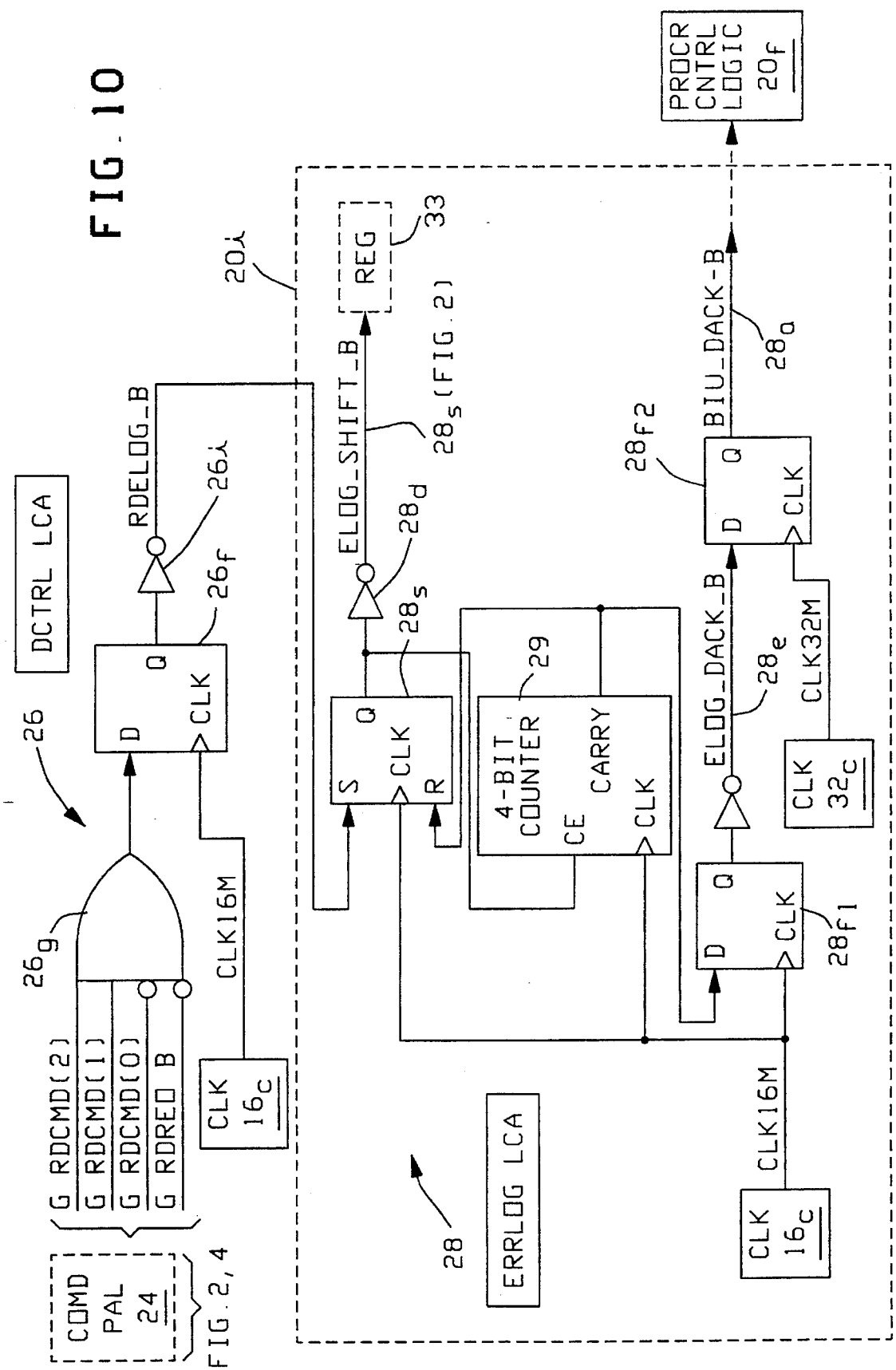
FIG. 10 is a drawing showing how commands are synchronized between the error-log logic cell array and the data control logic cell array.

The signal G_RDCMD(2:0) at FIGS. 4, 9, and 10 which is the Read command, will retain the value for one more clock, and then will go back to the RIDLE (Read-idle) state seen at the bottom of FIG. 9. This procedure is done so that the command can be properly synchronized from 32 megahertz to the 16 megahertz that the data control unit 26 (DCTRL LCA) is running at.

The signal G_RDCMD(2:0) is asserted for five (32 megahertz) clocks. On the first clock, it is driven alone so that it will become stable. On the second clock, G_RDREQ_B becomes "active" and remains so for three clocks. This insures that the command will remain active for at least one 16 megahertz clock. The command is decoded at 16 megahertz, FIG. 10, and latched into a single flip-flop. On the fifth clock, G-RDREQ_B is "active" alone again to insure that it remains stable as the signal G-RDCOMD (2:0) transitions from low to high.

Once the error log operation has begun, it must be synchronized to the 16 megahertz clock rate, since the data is stored in registers 30, (FIG. 11) which is clocked at this speed.

FIG. 10 is an illustration of the circuitry which accomplishes the synchronization operation. As seen in FIG. 10, the data control (DCTRL LCA) unit 26 provides a gate 26g, a D flip-flop 26f, and an inverter 26i which are activated by the 16 megahertz clock, 16c.

The signals G_ADEQ_B and the signals G_RD-CMD(2:0) in FIG. 10 are synchronized to 16 megahertz, and the output of the flip-flop 26f is inverted by the inverter 26i and driven over to the error-log unit 28 (ERRLOGLCA) by means of the signal RDELOG_B for one or two clocks, depending upon the synchronization of the signals.

The signal read error log, RDELOG_B of FIG. 10 is used to set a SR flip-flop 28s. The output of this flip-flop causes a four-bit counter 29 to start counting to 16. When the count of 16 has been met, the "carry" byte is set for one clock, which will disable the signal ELOG_SHIFT_B on line 28d, and will also "enable, for one clock, the signal ELOG_DACK_B on line 28e.

The signal ELOG_DACK_B on line 28e (FIG. 10) will now be synchronized to 32 megahertz via the flip-flop 28f2 which is fed by the 32 megahertz clock 32c. The signal BIU_DACK_B on line 28a is then driven back to the processor control logic 20f to indicate that valid error-log data (ELOG) is now available.

FIG. 11 shows how the data is shifted from the 16 bit shiftable register 30 in the error-log logic ERRLOG LCA 28 into a 48-bit shiftable register 33 in the gate array 32 by means of using the signal SHIFT_ELOG_B. It will be noted that the data is shifted into only the lower 16 bits of the register 33 in the gate array 32. SR flip-flop 28s is the source for the SHIFT_ELOG_B signal.

Once the 16 bits have shifted, the signal BIU_DACK_B (bus interface unit data acknowledge) FIG. 10, line 28$_a$, becomes active and the processor 20 can access the data through the multiplexor 31 located in the data path gate array 32, FIG. 4, by means of the signal G_MSEL(3:0) equal "1000", as seen in FIG. 11.

FIG. 11 also indicates the relationship between the error-log logic cell array 28 and gate array 32. The error-log unit 28 is provided with a 16-bit shiftable register 30 which can receive information as to an (i) invalid address error, (ii) a retry limit error, (iii) a corrupt data error or (iv) even possible allowance for future types of errors. This information in the register 30 can be shifted out into the 48-bit shiftable register 33, of the gate array 32. The gate array 32 will drive all 48 bits from the register 33 onto the G-bus 51 via multiplexor 32x, FIG. 11, for conveyance to the processor 20.

The end of the operation is illustrated by the timing diagram shown in FIG. 12 and also in FIG. 9 as (READ-END). From the period where the command to "Read" the error-log was initiated, to the end of the cycle, it is seen that the G_Bus 51, FIG. 11, will carry 48 bits of error-log data between the clock "0" and clock "3", FIG. 12.

Once the signal BIU_DACK_B (FIG. 12) becomes active, then the signal G_DACK_B and the signal G_DATAPEND_B become active on the next clock, to signal to the processor 20 that valid data is now on the G_BUS 51 and that the operation is complete.

The signal OPDONE_B becomes active at the same time to signal to all of the other state machines (34, 36, 38, 40, and 24,) that they can transition to Idle if they have not already done so.

Described herein has been a error-logging system used in a specialized dual bus computer system. The system provides methods for logging errors within any device composed of many inputs and flip-flops where error data is shifted into a device that is pin-constrained so that it can be read by a processor onto a data bus which must have a minimum number of tap load connections feeding on it.

What is claimed is:

1. An error logging system for a computer network wherein dual system busses carrying digital data are monitored by a system bus interface logic unit at a Y clock rate and enabled to report to a central processor means at an X clock rate, said system comprising:

(a) said system bus logic unit for monitoring data on said dual system busses to detect multiple types of errors, including:

(a1) first error logging register means receiving error data at said Y clock rate, from error sensing means;

(a2) said error sensing means for monitoring data on said dual system busses and generating separate error data signals for (i) an error code for invalid address;

(ii) an error code for expiration of retry transmission time;

(iii) an error code for invalid data error;

(b) means to signal said processor means that said error data signals have accumulated in said first error logging register means;

(c) said processor means for generating a Read command at said X clock rate to a data path control logic unit;

(d) said data path control logic unit for converting said X clock rate Read command to a Y clock rate Read command for transmittal to said first error logging register means and including:

(d1) means for shifting at said Y clock rate said separate error data signals from said first error logging register means to a second error logging register means in a data path gate array means;

(d2) means to parallel load a synchronization register means, at said X clock rate, with said separate error data signals from said second error logging register means;

(e) data path gate array means for receiving said separate error data signals at said Y clock rate in said second error logging register means and including:

(e1) parallel transfer means, controlled by said data path control logic, for loading said separate error data signals from said second error logging register means into said synchronization register means at said X clock rate said parallel transfer means including:

(e1a) processor bus means for transmitting said separate error data signals to said processor means.

2. The system of claim 1 wherein said Y clock rate is 16 MHz and said X clock rate is 32 MHz.

3. The system of claim 1 wherein said first error logging register means includes:

(a) special and separate dedicated bit positions for each type of said (i) (ii) and (iii) error data signals.

4. The system of claims 3 wherein said first error logging register means includes:

(a) spare unused bit positions available for logging error data for other network conditions.

5. In a network wherein a processor means operates at an X clock rate and dual system bus means transfers data at a Y clock rate, a method for conveying multiple types of error data to said processor means including the steps of:

(a) sensing at said Y clock rate, data being transmitted on said dual system bus means;

(b) generating, at said Y clock rate, separate error data signals for each type of error sensed on said dual system busses;

(c) placing said error data in a first error register means at said Y clock rate and at discrete bit positions reflecting the type of error sensed;

(d) signaling said processor means that error data has accumulated in said first error register means;

(e) generating a Read command from said processor means at said X clock rate and converting said Read command to said Y clock rate for transmittal to said first error register means;

(f) shifting said error data from said first error register means to a second error register means at said Y clock rate;

(g) loading said error data from said second error register means into a synchronization register means at said X clock rate; and (h) transmitting said error data in said synchronization register means to said processor means at said X clock rate.

* * * * *